United States Patent
Kusano et al.

(10) Patent No.: US 10,264,030 B2
(45) Date of Patent: Apr. 16, 2019

(54) NETWORKED MICROPHONE DEVICE CONTROL

(71) Applicant: Sonos, Inc, Santa Barbara, CA (US)

(72) Inventors: Mieko Kusano, Santa Barbara, CA (US); Dayn Wilberding, Santa Barbara, CA (US); Jonathan Wenocur, Cambridge, MA (US); Jonathan Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/438,725

(22) Filed: Feb. 21, 2017

(65) Prior Publication Data

US 2017/0245076 A1    Aug. 24, 2017

(51) Int. Cl.
*H04R 3/00* (2006.01)
*G10L 15/22* (2006.01)
*H04L 29/06* (2006.01)

(52) U.S. Cl.
CPC ...... *H04L 65/1059* (2013.01); *H04L 65/1096* (2013.01); *H04R 3/00* (2013.01);
(Continued)

(58) Field of Classification Search
CPC ............... H04R 29/004; H04R 29/007; H04R 227/003; H04R 227/005; H04R 2420/07;
(Continued)

(56) References Cited

U.S. PATENT DOCUMENTS

| 4,741,038 A | 4/1988 | Elko et al. |
| 4,941,187 A | 7/1990 | Slater |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Sonia L Gay
(74) *Attorney, Agent, or Firm* — McDonnell Boehnen Hulbert & Berghoff LLP

(57) ABSTRACT

Systems and methods disclosed herein include, while a microphone of a first networked microphone device is enabled, determining whether a first reference device is in a specific state, and in response to determining that the first reference device is in the specific state, disabling the microphone of the first networked microphone device. Some embodiments further include, while the microphone of the first networked microphone device is enabled, receiving a command to disable the microphone of the first networked microphone device via one of the microphone of the networked microphone device or a network interface of the networked microphone device, and in response to receiving the command to disable the microphone of the networked microphone device via one of the microphone of the networked microphone device or the network interface of the networked microphone device, disabling the microphone of the networked microphone device.

23 Claims, 7 Drawing Sheets

(52) U.S. Cl.
CPC .. *G10L 2015/223* (2013.01); *H04R 2227/005* (2013.01); *H04R 2420/07* (2013.01)

(58) Field of Classification Search
CPC ............. H04L 65/1059; H04L 65/1096; G10L 2015/223
See application file for complete search history.

(56) References Cited

U.S. PATENT DOCUMENTS

| | | |
|---|---|---|
| 5,440,644 A | 8/1995 | Farinelli et al. |
| 5,740,260 A | 4/1998 | Odom |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van Dyke et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno Mengibar et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,042,556 B2 | 5/2015 | Kallai et al. |
| 9,094,539 B1 * | 7/2015 | Noble ..................... H04N 7/00 |
| 9,215,545 B2 | 12/2015 | Dublin et al. |
| 9,251,793 B2 | 2/2016 | Lebeau et al. |
| 9,253,572 B2 | 2/2016 | Bedingfield, Sr. et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Melendo Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,820,036 B1 | 11/2017 | Tritschler et al. |
| 9,820,039 B2 | 11/2017 | Lang |
| 9,826,306 B2 | 11/2017 | Lang |
| 9,881,616 B2 | 1/2018 | Beckley et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0072462 A1 | 4/2003 | Hlibowicki |
| 2003/0157951 A1 | 8/2003 | Hasty |
| 2004/0024478 A1 | 2/2004 | Hans et al. |
| 2005/0164664 A1 | 7/2005 | DiFonzo et al. |
| 2005/0195988 A1 | 9/2005 | Tashev et al. |
| 2005/0268234 A1 | 12/2005 | Rossi, Jr. et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0140058 A1 | 6/2007 | McIntosh et al. |
| 2007/0142944 A1 | 6/2007 | Goldberg et al. |

(56) References Cited

U.S. PATENT DOCUMENTS

| | | |
|---|---|---|
| 2008/0090537 A1* | 4/2008 | Sutardja .............. G06F 1/3203 455/232.1 |
| 2008/0247530 A1* | 10/2008 | Barton .................. H04M 3/382 379/216.01 |
| 2008/0248797 A1* | 10/2008 | Freeman ........... H04M 1/72522 455/425 |
| 2008/0301729 A1 | 12/2008 | Broos et al. |
| 2009/0003620 A1* | 1/2009 | McKillop ............... G06F 3/165 381/80 |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1* | 2/2010 | Franco .................... H04M 3/56 455/416 |
| 2010/0075723 A1* | 3/2010 | Min ....................... H01R 24/58 455/569.1 |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0299706 A1 | 12/2011 | Sakai |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2012/0308044 A1* | 12/2012 | Vander Mey ....... H04L 12/1822 381/104 |
| 2013/0006453 A1 | 1/2013 | Wang et al. |
| 2013/0024018 A1 | 1/2013 | Chang et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0198298 A1* | 8/2013 | Li et al. ........... H04N 21/41407 709/206 |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0277650 A1 | 9/2014 | Zurek et al. |
| 2014/0363022 A1 | 12/2014 | Dizon et al. |
| 2014/0369491 A1* | 12/2014 | Kloberdans ......... H04M 1/6008 379/421 |
| 2015/0010169 A1 | 1/2015 | Popova et al. |
| 2015/0016642 A1 | 1/2015 | Walsh et al. |
| 2015/0063580 A1 | 3/2015 | Huang et al. |
| 2015/0086034 A1 | 3/2015 | Lombardi et al. |
| 2015/0104037 A1 | 4/2015 | Lee et al. |
| 2015/0154976 A1 | 6/2015 | Mutagi |
| 2015/0180432 A1 | 6/2015 | Gao et al. |
| 2015/0189438 A1 | 7/2015 | Hampiholi et al. |
| 2015/0200454 A1 | 7/2015 | Heusdens et al. |
| 2015/0222987 A1 | 8/2015 | Angel, Jr. et al. |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0088392 A1 | 3/2016 | Huttunen et al. |
| 2016/0093304 A1 | 3/2016 | Kim et al. |
| 2016/0098393 A1 | 4/2016 | Hebert |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1 | 12/2016 | Starobin et al. |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1 | 8/2017 | Williams et al. |
| 2017/0242651 A1 | 8/2017 | Lang et al. |
| 2017/0242653 A1 | 8/2017 | Lang et al. |
| 2017/0270919 A1 | 9/2017 | Parthasarathi et al. |
| 2017/0353789 A1 | 12/2017 | Kim et al. |
| 2018/0033428 A1 | 2/2018 | Kim et al. |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |

(56) References Cited

FOREIGN PATENT DOCUMENTS

| KR | 20100111071 A | 10/2010 |
|---|---|---|
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Aug. 11, 2017, issued in connection with U.S. Appl. No. 15/131,776, filed Apr. 18, 2016, 7 pages.
Final Office Action dated Jun. 15, 2017, issued in connection with U.S. Appl. No. 15/098,718, filed Apr. 14, 2016, 15 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 1, 2017, issued in connection with U.S. Appl. No. 15/223,218, filed Jul. 29, 2016, 7 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Apr. 19, 2017, issued in connection with U.S. Appl. No. 15/131,776, filed Apr. 18, 2016, 12 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Jun. 30, 2017, issued in connection with U.S. Appl. No. 15/277,810, filed Sep. 27, 2016, 13 pages.
Notice of Allowance dated Jul. 12, 2017, issued in connection with U.S. Appl. No. 15/098,805, filed Apr. 14, 2016, 8 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Jun. 28, 2018, issued in connection with U.S. Appl. No. 15/438,744, filed Feb. 21, 2017, 3 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
Morales-Cordovilla et al. "Room Localization for Distant Speech Recognition," Proceedings of Interspeech 2014, Sep. 14, 2014, 4 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Sep. 14, 2017, issued in connection with U.S. Appl. No. 15/178,180, filed Jun. 9, 2016, 16 pages.
Non-Final Office Action dated Mar. 16, 2018, issued in connection with U.S. Appl. No. 15/681,937, filed Aug. 21, 2017, 5 pages.

(56) References Cited

OTHER PUBLICATIONS

Non-Final Office Action dated Apr. 18, 2018, issued in connection with U.S. Appl. No. 15/811,468, filed Nov. 13, 2017, 14 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 11, 2018, issued in connection with U.S. Appl. No. 15/719,454, filed Sep. 28, 2017, 15 pages.
Notice of Allowance dated Dec. 13, 2017, issued in connection with U.S. Appl. No. 15/784,952, filed Oct. 16, 2017, 9 pages.
Notice of Allowance dated Dec. 15, 2017, issued in connection with U.S. Appl. No. 15/223,218, filed Jul. 29, 2016, 7 pages.
Notice of Allowance dated Mar. 20, 2018, issued in connection with U.S. Appl. No. 15/784,952, filed Oct. 16, 2017, 7 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Notice of Allowance dated Mar. 9, 2018, issued in connection with U.S. Appl. No. 15/584,782, filed May 2, 2017, 8 pages.
Tsiami et al. "Experiments in acoustic source localization using sparse arrays in adverse indoors environments", 2014 22nd European Signal Processing Conference, Sep. 1, 2014, 5 pages.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.

* cited by examiner

NETWORKED MICROPHONE DEVICE CONTROL

CROSS-REFERENCE TO RELATED APPLICATIONS

The entire contents of U.S. Provisional App. 62/298,410, filed Feb. 22, 2016, titled "Default Playback Device(s)" and U.S. Provisional App. 62/298,418, filed Feb. 22, 2016, titled "Audio Response Playback," are incorporated herein by reference. This application also incorporates by reference the entire contents of (i) U.S. Provisional App. 62/298,433, filed Feb. 22, 2016, titled "Room-corrected Voice Detection"; (ii) U.S. Provisional App. 62/298,439, filed Feb. 22, 2016, titled "Content Mixing"; (iii) U.S. Provisional App. 62/298,425, filed Feb. 22, 2016, titled "Music Service Selection"; (iv) U.S. Provisional App. 62/298,350, filed Feb. 22, 2016, titled "Metadata exchange involving a networked playback system and a networked microphone system"; (v) U.S. Provisional App. 62/298,388, filed Feb. 22, 2016, titled "Handling of loss of pairing between networked devices"; (vi) U.S. Provisional App. 62/298,393, filed Feb. 22, 2016, titled "Action based on User ID"; and (vii) U.S. Provisional App. 62/312,350, filed Mar. 23, 2016, titled "Voice Control of a Media Playback System".

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
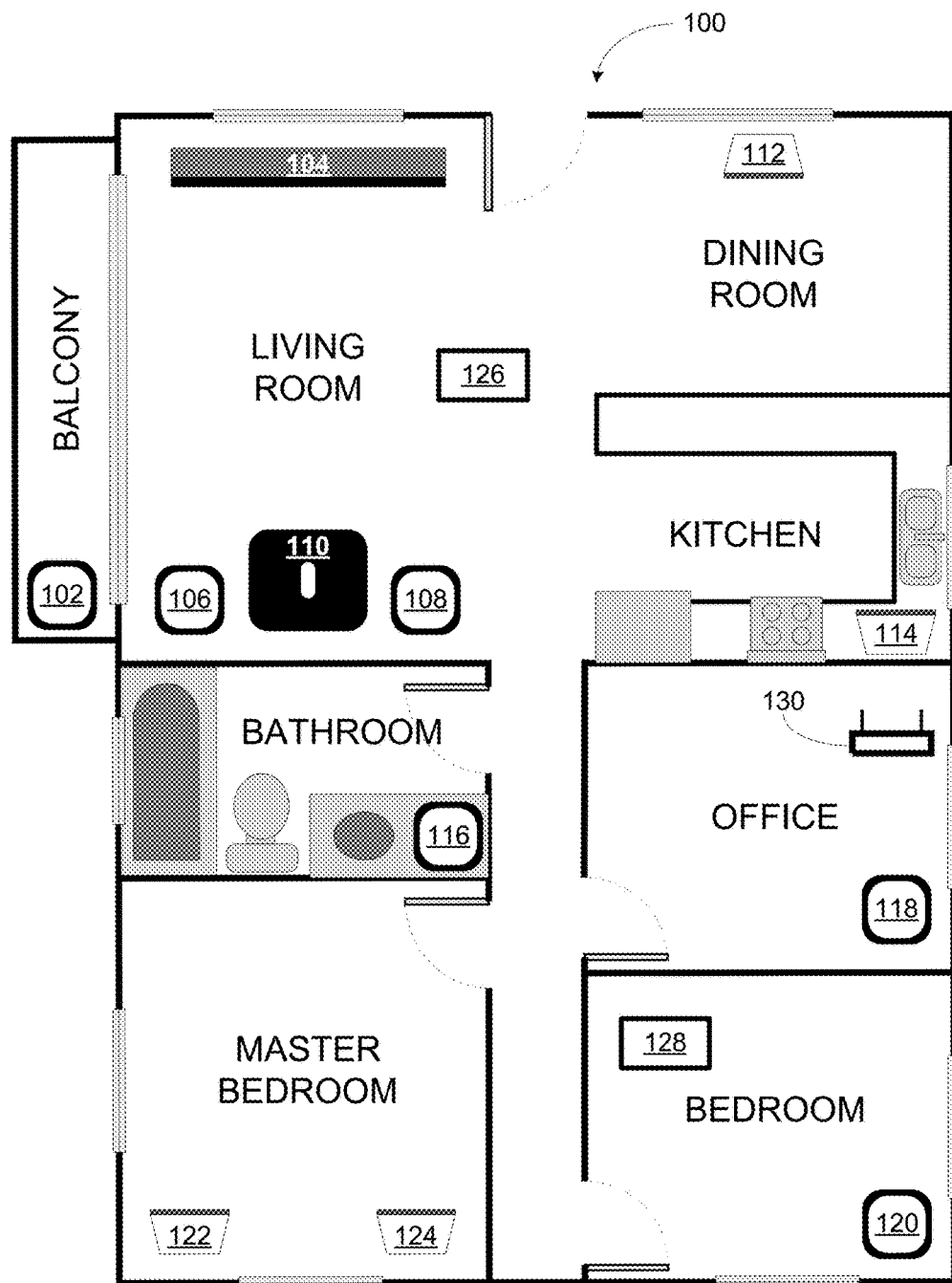
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

In operation, the microphone(s) of a networked microphone device ("NMD") are typically always on and listening for a specific "wake word" or "wake phrase." In response to hearing the "wake" word or phrase, the NMD (i) records audio, e.g., the spoken words after the "wake" word/phrase, (ii) analyzes the recorded audio (or perhaps sends the recorded audio to a server for analysis), and (iii) takes action based on the recorded audio. In some instances, the action taken by the NMD may include providing information to a user, typically via a speaker of the NMD or a speaker associated with the NMD. Such information may include local weather reports, current traffic information, answers in response to questions (e.g., "How tall is the Empire State Building?"), and so on. In some instances, the action taken by the NMD may include controlling or changing the state of one or more networked devices. Such networked devices may include lights, garage doors, locks, networked media playback systems, televisions, thermostats, home alarm systems, and so on.

However, it may be desirable in some instances for the NMD to disable its microphone(s) from even listening for the "wake word" or "wake phrase." For example, it may be undesirable for an NMD to have its microphone(s) enabled and listening for its "wake" word or phrase when a user is sleeping, engaging in sensitive conversations either in person or via telephone or computer, or perhaps simply enjoying private family time (e.g., dinner, movies, story time with children) because the NMD responds (typically via a speaker) with information and/or takes some other action in response to hearing its "wake" word or phrase, and it can be annoying or off-putting if the NMD interrupts their private time or activities with errant responses and/or actions.

In operation, disabling an NMD's microphone(s) has the effect of disconnecting the microphone from the NMD, thereby rendering the NMD unable to detect or process any audible signals/sounds in the room where the NMD is located while its microphone(s) is disabled. Disabling an NMD's microphone(s) could be accomplished via any of several different ways. For example, in some embodiments, disabling an NMD's microphone(s) may include switching off the power supplied to the microphone and/or microphone subsystem of the NMD. In some embodiments, disabling an NMD's microphone(s) may include switching off signal processing components configured to analyze and process sound detected by the microphone(s) of the NMD. In still further embodiments, disabling an NMD's microphone(s) may include disconnecting a signal path between the microphone(s) of the NMD and the signal processing components of the NMD configured to analyze and process sound detected by the microphone(s) of the NMD. The NMD's microphone(s) could also be disabled in any other way that prevents the NMD from listening to or otherwise detecting and/or analyzing audio sounds, speech, or other audible signals/sound, including but not limited to any "wake" word/phrase that would trigger the NMD to perform some function While users may be able to unplug, power-off, or physically disable and re-enable the microphone(s) of an NMD via manual activation of a switch or button on the NMD, in some instances, taking such manual action can be cumbersome, inconvenient, or otherwise undesirable. It may be particularly cumbersome, inconvenient, and/or otherwise undesirable to disable multiple NMDs if a user had to manually actuate a physical button or switch on each NMD.

Because it is advantageous for an NMD to have the ability to disable and/or re-enable its microphone(s) without a user having to physically actuate a button/switch or power-off or unplug the NMD, in some embodiments, the NMD is configured to disable its microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD is additionally or alternatively configured to enable its microphone(s) in response to any one or more of: (i) determining that a reference device is in a certain state; and (ii) receiving a command via a network interface of the NMD. Example reference devices include lights, garage doors, locks, networked media playback systems, televisions, thermostats, home alarm systems, other household sensors (e.g. motion sensors, audio sensors, light sensors, or other sensors).

Some embodiments described herein include, while the microphone of the NMD is enabled, (i) determining whether a first reference device is in a specific state, and (ii) in response to determining that the first reference device is in the specific state, disabling the microphone of the NMD. Some embodiments additionally or alternatively include, while the microphone of the NMD is disabled, (i) determining that the first reference device is no longer in the specific state and, (ii) in response to determining that the first reference device is no longer in the specific state, enabling the microphone of the NMD.

Some embodiments additionally or alternatively include, while the microphone of the NMD is disabled, (i) determining that a second reference device is in a particular state, and (ii) in response to determining that the second reference device is in the particular state, enabling the microphone of the networked microphone device.

Some embodiments additionally or alternatively include, while the microphone of the NMD is enabled, (i) receiving a command to disable the microphone of the NMD via one of (i-a) the microphone of the NMD or (i-b) a network interface of the NMD, and (ii) in response to receiving the command to disable the microphone of the NMD via one of the microphone of the NMD or the network interface of the NMD, disabling the microphone of the NMD.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
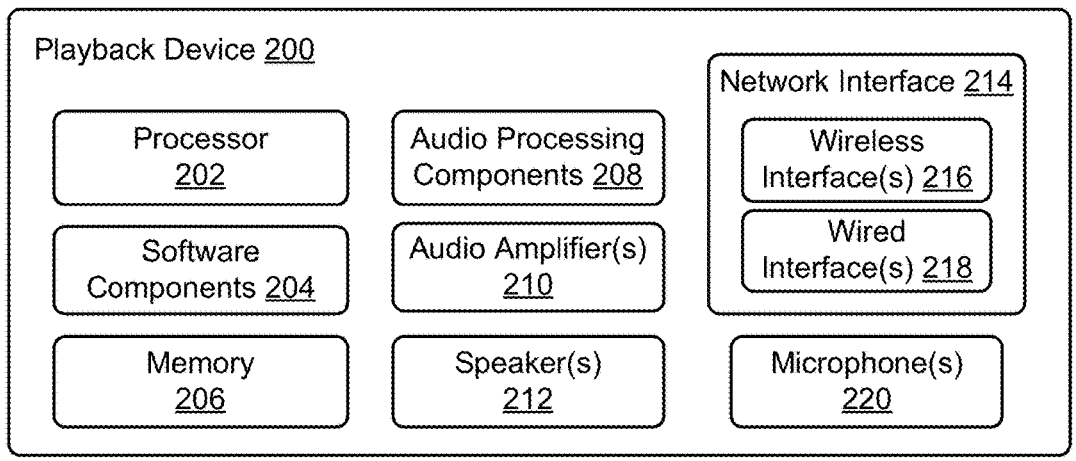
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
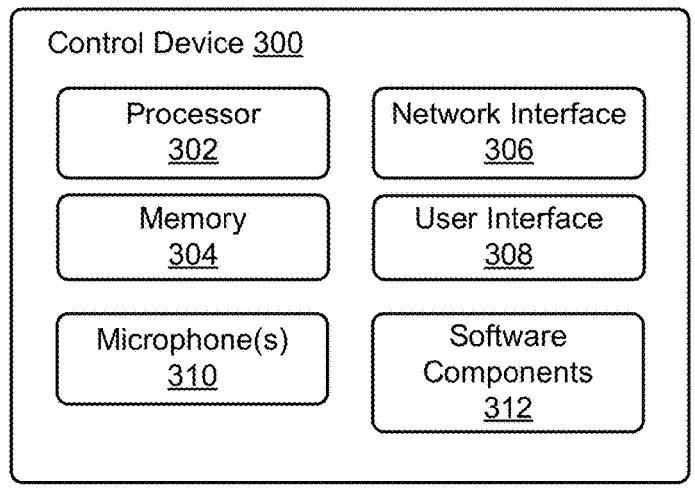
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
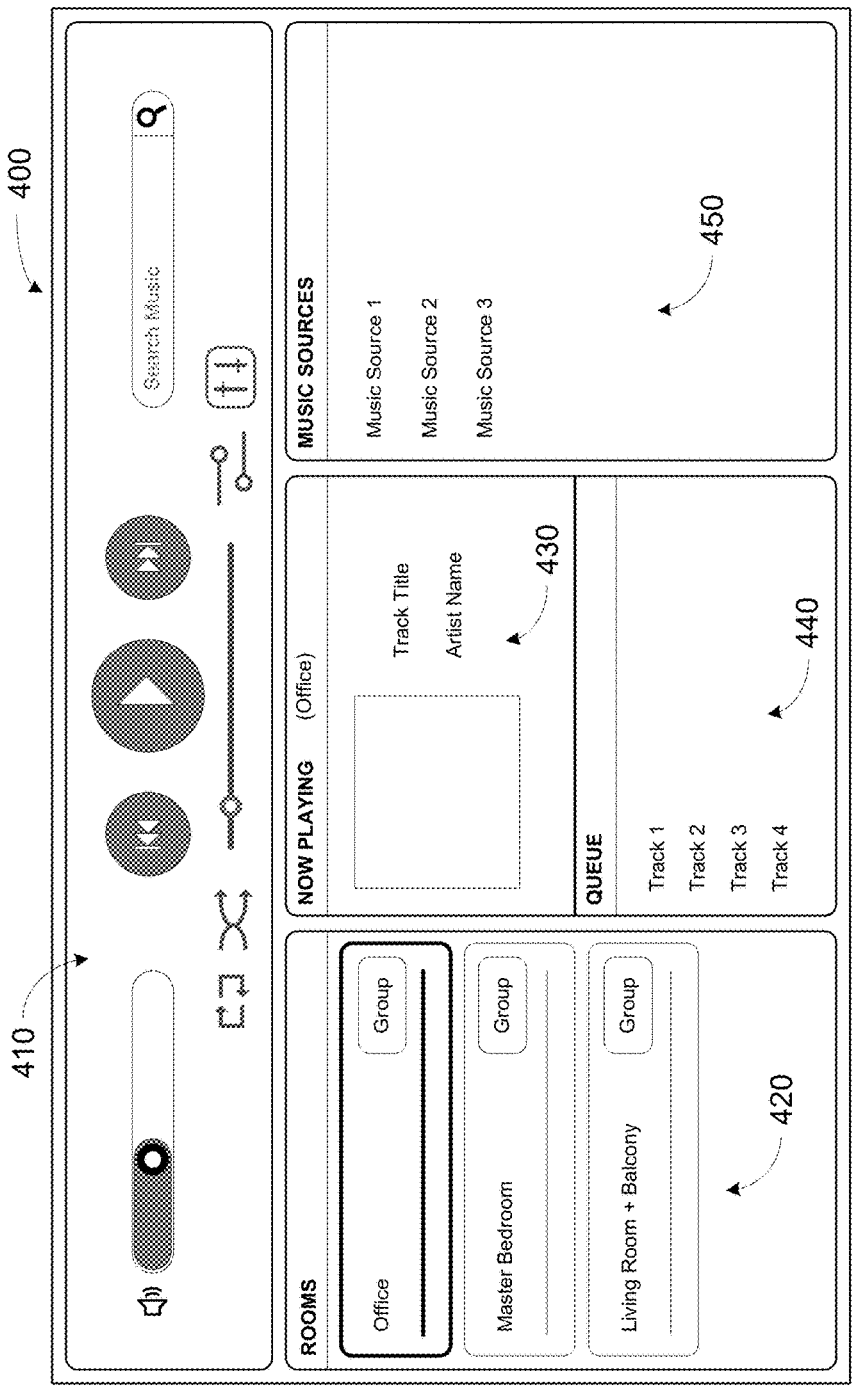
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
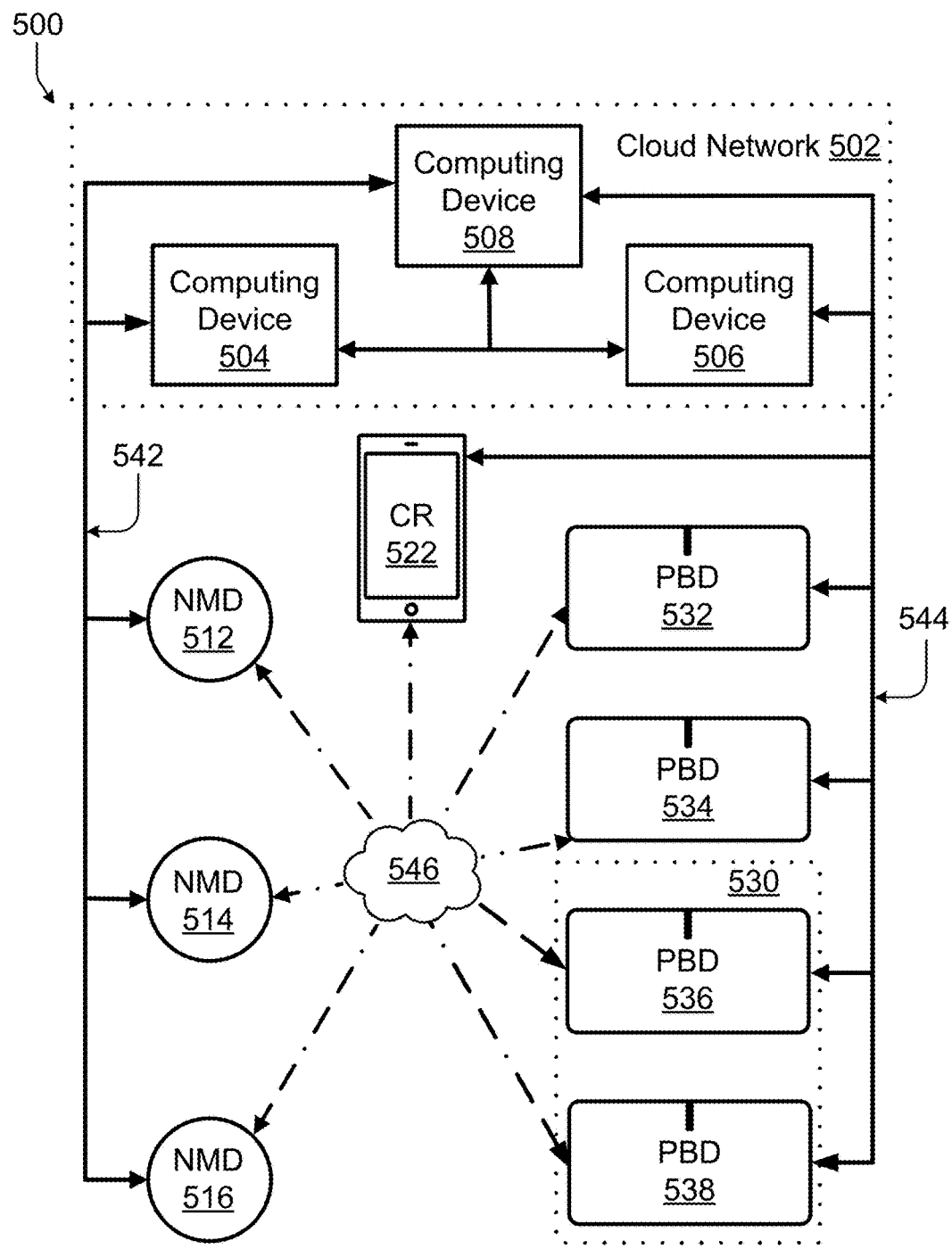
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
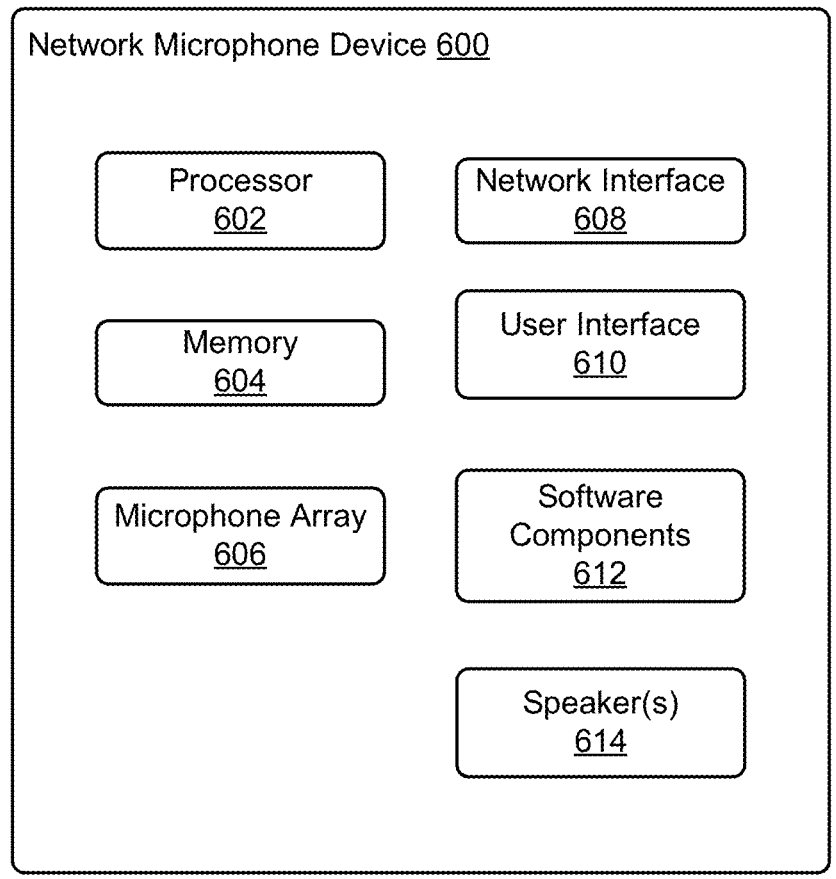
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

It may be desirable in some instances for a networked microphone device ("NMD") to disable one or more (or all) of its microphones. It may further be desirable for one or more (or all) NMDs in a system of multiple NMDs to disable one or more (or all) of their microphones. For example, it may be desirable for any one or more (or all) of NMDs 512, 514, and 516 to disable their microphones.

As described earlier, although an NMD may be configured to listen for a specific "wake word" or "wake phrase" to trigger the NMD to record spoken audio for analysis (and to take subsequent action based on or in response to the recorded audio), the microphones of an NMD are still typically always on, active, and listening for its "wake" word or phrase. It may be desirable for the NMD to disable its microphone(s) from even listening for the "wake word" or "wake phrase" when, for example, a user is sleeping, engaging in sensitive conversations either in person or via telephone or computer, or perhaps simply enjoying private family time (e.g., dinner, movies, story time with children). Not only may some users not want NMDs listening all of the time, some users may not want their NMDs (and/or other devices connected thereto) to interrupt their private time and activities with errant responses and/or actions.

And while users may be able to unplug, power-off, or physically disable and/or re-enable the microphone(s) of an NMD via manual activation of a switch or button on the NMD, in some instances, taking such manual action can be cumbersome, inconvenient, or otherwise undesirable. It may be particularly cumbersome, inconvenient, and/or otherwise undesirable to disable multiple NMDs if a user had to manually actuate a physical button or switch on each NMD in his or her home.

Because it is advantageous for an NMD to have the ability to disable and/or re-enable its microphone(s) without a user having to physically actuate a button/switch or power-off or unplug the NMD, in some embodiments, the NMD (or perhaps a computing device configured to control the NMD, e.g., computing device 504) is configured to disable the NMD microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD (or perhaps a computing device configured to control the NMD, e.g., computing device 504) is additionally or alternatively configured to enable (or re-enable) the NMD microphone(s) in response to any one or more of: (i) determining that a reference device is in a certain state; and (ii) receiving a command via a network interface of the NMD. Example reference devices include lights, garage doors, locks, networked media playback systems, televisions, thermostats, home alarm systems, other household sensors (e.g. motion sensors, audio sensors, light sensors, or other sensors).

In some embodiments, an NMD is configured to disable and/or re-enable its microphone(s) based on a state of another device, referred to as a "reference" device in the examples disclosed herein. In operation, the NMD (or perhaps another device in communication with the NMD) determines whether a reference device is in a particular state, and then the NMD disables its microphone(s) in response to determining that the reference device is in that particular state.

In some embodiments, determining the state of the first reference device may include querying the device for its state information or monitoring the first reference device's state information. Determining the state of the first reference device may additionally or alternatively include receiving a message via a network interface of the NMD, where the message indicates that the first reference device is in the specific state. In operation, such a message could be sent by the first reference device or a computing device controlling and/or monitoring the first reference device. Other examples of determining a state may exist, too. This may be desirable in scenarios where the user may want to disable the microphone of one of the NMDs 512, 514, and 516 when the first reference device performs a particular action or enters a particular state.

In operation, communication between an NMD and a reference device to convey state information or state change information can occur in multiple ways.

In some embodiments, communication of state information between the NMD and the reference device may occur directly (or at least substantially directly) between the NMD and the reference device. For example, with reference to FIG. 5, if the NMD is NMD 512 and the reference device is PBD 532, then communication of state information between NMD 512 and PBD 532 may occur in a peer-to-peer or similar fashion over communication means 546. As described earlier, communication means 546 may include one or more of for example, Bluetooth™ (IEEE 802.15), NFC, Wireless direct, and/or Proprietary wireless, among other possibilities including but not limited to Ethernet, WiFi (IEEE 802.11), and other wired or wireless communication protocols and methods.

In some embodiments, communication of state information between the NMD and the reference device may occur via one or more intermediary devices. For example, with reference to FIG. 5 again, if the NMD is NMD 512 and the reference device is PBD 532, then communication of state information between NMD 512 and PBD 532 may occur through one or more intermediary devices, including but not limited to one or more of computing device 506, computing device 508, and/or computing device 504. For example, PBD 532 may communicate its current state to computing device 506 via communication path 544, computing device 506 may communicate the current state of PBD 532 to computing device 504 over one or more public or private network links, and then computing device 504 may communicate the current state of PBD 532 to NMD 512 via communication path 542.

In some embodiments, a first computing device may monitor and/or control the state of a reference device, and then communicate state changes (and/or perhaps other state information) of the reference device to a second computing device configured to control the NMD, e.g., to control or command the NMD to disable/enable the NMD's microphone(s).

In one example, with reference to FIG. 5, computing device 506 monitors the state of PBD 532. When a user instructs PBD 532 to play certain media content (e.g., by entering a command via CR 522 or speaking a command via an NMD 516), PBD 532 (i) plays the requested media content in response to the user command, and (ii) perhaps additionally informs computing device 506 that it is playing media content (and perhaps that it is playing particular media content) by sending a message or other communication to computing device 506 via communication path 544. The message or other communication that PBD 532 sends to computing device 506 may comprise state information and/or state change information for PBD 532. In response to receiving the state and/or state change information from PBD 532, computing device 506 updates a state table (or similar database or datastore) associated with PBD 532 and/or communicates the state and/or state change to one or more other computing devices, e.g., computing device 504, computing device 508, or perhaps even directly to NMD 512.

In a related example, again with reference to FIG. 5, computing device 506 controls the state of PBD 532. When a user instructs PBD 532 to play certain media content (e.g., by entering a command via CR 522 or speaking a command vian NMD 516), then CR 522 (or perhaps NMD 516 in the case of the voice command) sends a message or other communication to computing device 506 to request that PBD 532 play the requested media content. Computing device 506 may optionally verify whether PBD 532 is able and/or authorized to play the requested media content. Then, computing device 506 instructs PBD 532 to play the requested media content via one or more messages, commands, or other communications via communications path 544. PBD 532 may confirm receipt of the command(s) received from computing device 506 and also confirm successful execution of the command(s) (i.e., confirm that it is playing the requested media content) by sending one or more response messages to computing device 506 via communication path 544. In response to receiving the one or more response messages and/or the state and/or state change information from PBD 532, computing device 506 updates a state table (or similar database or datastore) associated with PBD 532 and/or communicates the state and/or state change to one or more other computing devices, e.g., computing device 504, computing device 508, or perhaps even directly to NMD 512.

Other examples of communicating state information and/or state change information of a reference device(s) either directly or indirectly between the reference device and the NMD are possible as well, including but not limited to scenarios where (i) one or more intermediate computing devices (e.g., computing device 506 individually or in combination with other computing devices) monitor or control the state or state changes of the reference device (e.g., one or more of PBDs 532-538) and advise an NMD of the state or state change information for the reference device, where the NMD enables/disables its microphone(s) based on the state and/or state changes of the reference device; (ii) one or more intermediate computing devices (e.g., computing device 506 individually or in combination with other computing devices) monitor or control the state or state changes of the reference device (e.g., one or more of PBDs 532-538) and advise one or more computing devices controlling the NMD (e.g., computing device 504 individually or in combination with other computing devices) of the state or state change information for the reference device, where the one or more computing devices controlling the NMD in turn instruct/command the NMD to enable/disable its microphone(s) based on the state and/or state changes of the reference device; and (iii) one or more intermediate computing devices (e.g., any of computing devices 504, 506, and 508 individually or in combination with other computing devices) pass state or state change information of the reference device (e.g., one or more of PBDs 532-538) received from the reference device to an NMD (e.g., one or more of NMDs 512-516), where the NMD in turn enables/disables it microphone(s) based on the state and/or state changes of the reference device passed from the reference device to the NMD via the intermediate computing device(s).

The above-described examples relate to different ways of determining the state (or perhaps state change) of a reference device where the reference device is a playback device, but the above-described state or state change determination scenarios are equally applicable to examples where the reference device is something other than a playback device, such as a lighting system, home-security system, motion sensor, camera, alarm clock, television, thermostat, appliance, or any other device for which a state or state change can be monitored and/or controlled.

In some example embodiments, the first reference device is a lighting system. In such an example, the NMD (or perhaps a computing system configured to control the NMD, e.g., computing device 504 or another computing device) may be configured to determine whether the lighting system is in a particular state, e.g., whether the lights in a room are on or off. And if the NMD (or the computing system configured to control the NMD) determines that the lights in the room are off, the NMD disables its microphone(s). If the lighting system is network-connected, the NMD (or the computing system configured to control the NMD) can determine whether the lights are off by, for example, monitoring the state of a lighting controller configured to control the lights in the room, querying the lighting controller to obtain the state of the lights in the room, and/or receiving a message from the lighting controller. If the lighting system is not network-connected, the NMD (or the computing system configured to control the NMD) can determine whether the lights are off by, for example, monitoring a light sensor. The light sensor could be a component of the NMD or another networked device.

In another example embodiment, the first reference device is a media playback system or at least one media playback device of a media playback system, e.g., the media playback system 100 of FIG. 1, the one or more playback devices 200 of FIG. 2, or any other media playback system. In this scenario, the user may want to disable the microphone(s) of the NMD when the media playback system is playing a particular type of media, such as a relaxing song or audio content from a movie being shown on a television or other display device. In this example, the NMD (or another local or remote computing device) (i) determines whether the media playback system is in a particular state (i.e., whether one or more media playback devices of the system are playing a particular type of media), and (ii) disables the microphone(s) of the NMD in response to determining that the media playback system is in the particular state (i.e., in response to determining that one or more media playback devices of the system are playing the particular type media).

The particular state of the media playback system may include playing particular media content or a type of media content. The particular media content or type of media content may include audio or video content such as a yoga video or a deep meditation soundtrack that could easily be disrupted by the NMD erroneously responding to query or activating/deactivating some other device in the user's home (e.g., turning on the lights). Thus, it may be particularly desirable for the networked microphone device to disable the microphone when the media playback device (or media playback system) is playing such content.

The particular state of the media playback system may additionally or alternatively include the media playback device being above or below a particular volume level, or perhaps within a particular volume range. For example, the NMD may be configured to disable its microphone(s) in response to determining that the volume level of a media playback device (or a system of media playback devices) is above a certain threshold where it might be too loud for voice commands to be heard anyway. Additionally or alternatively, the NMD may be configured to disable its microphone(s) in response to determining that the volume level of a media playback device (or a system of media playback devices) is below a certain threshold volume level, for example, when the media playback device is playing media content late at night at a low volume, or when the media playback device is configured in a "night mode" where louder sounds in television shows, movies, or music are attenuated to reduce the likelihood of disturbing neighbors, roommates, or other family members in the house while watching shows or listening to music late at night. Additionally or alternatively, the NMD may be configured to disable its microphone(s) in response to determining that the volume level of a media playback device (or system of media playback devices) is within a certain threshold range while the media playback device (or system) is playing specific content, e.g., when the media playback device (or system) is playing relaxing music at a volume that suggest the user is sleeping, meditating, or otherwise relaxing and may not wish to be disturbed by the NMD responding audibly or otherwise taking an unexpected action in response to mistaking hearing its "wake" word/phrase.

Additionally, the particular state of the media playback system may also include the media playback system entering a particular media playback mode. For example, if the NMD (or another computing device) determines that the media playback system is in a "party mode" state where all of the media playback devices are configured to playback the same audio content in synchrony with each other, then the NMD may disable its microphone(s). It may be desirable to disable the microphone(s) of the NMD if the media playback system enters a particular playback mode such as a "party" mode or other type of playback mode. In this example, it may be desirable to disable the microphone(s) of the NMD to prevent the NMD from responding to or taking other action after mistaking hearing its "wake" word/phrase, which may disrupt media playback by the media playback system and thereby result in a less enjoyable social gathering for a user's guests.

In some embodiments, the NMD and first reference device may be contained in the same enclosure. For example, if the first reference device is a media playback device, and if the NMD is a component of the media playback device, then the NMD can disable and/or re-enable its microphone(s) based on the particular state of the media playback device. Or to state it another way, a media playback device equipped with one or more microphones can disable its one or more microphones based on one or more of (i) the type of content that the media playback device is playing and/or (ii) the playback mode of the media playback device (e.g., a party mode or other playback mode).

In some embodiments, the first reference device is a clock. The clock may be a hardware and/or software component of the NMD, a media playback device, or another device that the NMD (or other computer) can query, monitor, or receive some time/date message from. In such embodiments, the NMD (or other computer) can determine whether the clock is in a particular state (e.g., that the time of day is within a certain range, such as between 11 pm and 7 am), and in response to determining that the clock is in the particular state, disable the microphone(s) of the NMD. Other times of day or time ranges are also suitable. In this example, it may be desirable to disable the microphone of the NMD because the user may generally sleep during the time range and thus would not want the NMD to be listening to sounds in his or her bedroom or potentially be awoken by an erroneous activation of the NMD and/or awoken by the NMD taking some action in response to an erroneous trigger (e.g., turning on the lights in the room or playing music).

In some embodiments, the first reference device may include another NMD. In this embodiment, it may be desirable for the NMD (or a computing device configured to control the NMD) to determine whether the other NMD is in a particular state, and disable the microphone(s) of the NMD in response to determining that the other NMD is in the particular state. For example, the NMD may be configured to determine whether the microphone(s) of the other NMD has been disabled, and then disable its own microphone(s) in response to determining that the microphone(s) of the other NMD has been disabled. For example, if a user's home contains multiple NMDs and the user disables the microphone on one NMD, it may be desirable to disable all the microphones of the other NMDs, too.

Thus, in some of the above-described embodiments, the NMD (or a computer associated with the NMD): (i) determines whether the first reference device is in a first state, and (ii) disables the NMD's microphone(s) in response to determining that the first reference device is in the first state. In some embodiments, the NMD (or a computer associated with the NMD) may additionally (i) determine whether the first reference device is in a second state, and (ii) re-enable the NMD's microphone(s) in response to determining that the first reference device is in the second state.

In operation, the second state may be related to the first state. For example, if the first state is lights off, the second state might be lights on (or lights not off). Alternatively, the second state may not directly relate to the first state. For example, if the first state is lights off, the second state might be time of day is between 7 am and 11 pm. Further, in some embodiments, the first state may be a state of the first reference device, and the second state may be a state of a second reference device. In some embodiments, the NMD could be configured to enable/disable its microphone(s) based on additional multiple states of additional multiple disparate reference devices.

As described earlier, determining the state of a reference device (a first or a second reference device) may include querying the reference device for state information or receiving a message via a network interface of the first NMD (or other computing device configured to control the first NMD, e.g., computing device 504), where the message indicates a state of the reference device. In operation, such a message could be sent by the reference device or a computing device controlling and/or monitoring the reference device. Other examples of determining a state may exist, too. This may be desirable to a user because the user may want to enable the previously-disabled microphone(s) of one of the NMDs 512, 514, and 516 when the first or second (or third, fourth, and so on) reference device performs a particular action or enters a particular state.

For example, the NMD may be connected to or in communication with a reference device, such as a network-connected lighting system. In this example, the NMD may determine the state of the network-connected lighting system (e.g., lights-on state vs. lights-off state) and enable its microphone(s) if the lights are in the lights-on state.

In another example, the reference device may include a network-connected home security system. In this example, the NMD may determine the state of the network-connected home security system and enable its microphone(s) if the home security system is in an alarm-activated state. This may be particularly advantageous because enabling the NMD microphone(s) may allow a user to use the NMD to call the appropriate authorities in case of a break-in or fire.

In another example, the reference device may include an alarm clock or a device with an alarm clock function. In this example, the NMD may determine the state of the alarm clock (or whether a device with an alarm clock function is in a state where a wake-up alarm has been activated), and then activate the microphone(s) of the NMD in response to determining that the alarm clock (or the device with the alarm clock function) is in a wake-up alarm activated state. This functionality may be desirable for users who have configured the NMD to disable its microphone(s) while the user is sleeping, but who may want the NMD to enable (or re-enable) its microphone(s) when the user wakes up so that the user can then speak commands and/or request information from the NMD, e.g., turning on the lights, requesting weather information, playing a morning music playlist or news program.

In some embodiments, the NMD may additionally disable its microphone(s) in response to the user "snoozing" the alarm clock, or perhaps speaking a command to the NMD to instruct the NMD to snooze the alarm clock. For example, if the user hits a snooze button on the alarm clock, the alarm clock changes from a "wake up alarm has been activated" state to a "snooze" state. In some embodiments, the NMD may disable its microphone(s) in response to determining that the alarm clock is in the "snooze" state. The NMD may subsequently re-enable its microphone(s) in response to determining that the alarm clock has again changed to the "wake up alarm has been activated" state from the "snooze" state. Or alternatively, the NMD may simply disable its microphone(s) for some timeframe (e.g., 10 minutes) in response to receiving the voice command to snooze the alarm clock (or device with the alarm clock function), and then re-enable its microphone(s) after expiration of the timeframe.

In yet another example, the reference device may include a network-connected motion sensor, such as an infrared motion sensor, vibration sensor, camera, or any other type of motion sensor now known or later developed, including but not limited to standalone motion sensors and/or other devices that incorporate or otherwise contain motion sensors, e.g., accelerometer, gyroscopic, or other types of motion sensors. In this example, the NMD may determine the state of the network-connected motion sensor and enable its microphone(s) if the motion sensor is in a motion-detected state. For example, in rooms where the NMD has previously disabled its microphone(s) based on the state of one or more devices, the NMD may be configured to enable (or re-enable) its microphone(s) upon detecting that someone has entered the room. In yet another example, the reference device may include a motion sensor, where the NMD comprises the motion sensor, and where the NMD may be configured to disable or enable its microphone(s) based on the state of the motion sensor, e.g., enabling the microphone(s) in response to determining that the motion sensor is in a motion detected state and disabling the microphone(s) in response to determining that the motion sensor is not in the motion detected state (or perhaps vice versa).

In yet another example, the reference device may include a proximity detector, such as a Bluetooth™ Low Energy (BTLE) or Near Field Communication (NFC) or any other type of proximity detector now known or later developed, including but not limited to standalone proximity sensors and/or other devices that incorporate or otherwise contain proximity sensors. In this example, the NMD may determine the state of the proximity sensor and enable (or perhaps disable) its microphone(s) when the proximity sensor is in a motion-detected or presence-detected state. For example, in such embodiments, a user could wave his or her BTLE or NFC-equipped smartphone at a NMD, and the NMD could change its state (e.g., from disabled to enabled or from enabled to disabled) in response to detecting the motion or presence via the proximity detector.

In addition to disabling and enabling the microphone(s) of an NMD in response to determining the state of one or more reference devices, it also may be advantageous in some instances to disable and/or enable the microphone(s) of the NMD in response to receiving a command to disable and/or enable the microphone(s) of the NMD. In operation, the NMD may receive the command via one of (i) the microphone(s) of the NMD and/or (ii) a network interface of the NMD.

In some embodiments, the NMD may receive a command to disable its microphone(s) via the microphone(s) of the NMD. In such embodiments, the command may include a voice command to disable the microphone(s) of the NMD. For example, a user may want to disable the microphone(s) of the NMD without manually actuating a physical button on the NMD or powering off the NMD. For example, the user may speak a voice command such as "device, disable microphone," or "device, stop listening." And in response to receiving the voice command, the NMD disables its microphone(s).

Additionally or alternatively, the NMD may receive a command to disable its microphone(s) via a network interface of the NMD.

In some embodiments, the NMD may receive such a command from a controller device operable to configure and/or control the NMD. For example, the controller device may be a smartphone, tablet computer, or other computing device executing a user interface program operable to configure and/or control the NMD. In operation, the controller device sends a "Turn Off Microphone" or "Disable Microphone" or similar command to the NMD in response to receiving a user input via the user interface to disable the microphone(s) of the NMD.

In further embodiments, the NMD may receive such a command from another NMD or any other computing device operable to send a command over a network (e.g., a LAN, WAN, or other network infrastructure) to the NMD that causes the NMD to disable its microphone(s).

In some embodiments, the NMD is configured to disable its microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD is additionally or alternatively configured to enable (or re-enable) its microphone(s) in response to any one or more of: (i) determining that a reference device is in a certain state; and (ii) receiving a command via a network interface of the NMD.

For example, the user may want to enable the microphone(s) of the NMD after issuing a command to disable the microphone(s) of the NMD. In operation, the user may speak a voice command to disable the microphone (s), but then later decide that he or she would like to speak commands to the NMD to cause the NMD (or perhaps a media playback device communicatively coupled to the networked microphone device) to play music. So to cause the NMD to enable its microphone(s), the user may issue a command from the controller device that to enable the microphone(s) of the NMD, thereby causing the NMD to enable (or re-enable) its microphone(s) in response to receiving the command from the controller via the network interface of the NMD.

In another example, an NMD may receive a command to disable the microphone(s) of the NMD from a user via one of (i) the microphone(s) of the NMD or (ii) a network interface of the NMD. After the microphone is disabled, a reference device may subsequently enter a particular state that causes the NMD to enable its microphone(s) in response to determining that the reference device has entered that particular state. For example, a user may disable the microphone via the microphone by stating "device, disable microphone." Afterwards, a home security system may enter an alarm-activated state. In operation, the NMD (or a computer associated with the NMD) determines that the home security system has entered the alarm-activated state, and the NMD then enables its microphone(s) in response to determining that the home security system is in the alarm-activated state. One advantage to re-enabling the microphone(s) of the NMD after the user previously disabled the microphone(s) in this scenario is that, re-enabling the microphone(s) in response to determining that the home security system has entered the alarm-activated state enables the user to call authorities for help or speak other commands to the NMD.

In another example, the NMD (a first NMD) may be communicatively coupled to a one or more other NMDs (at least a second NMD). In embodiments where the NMD is a media playback device (or at least a component of a media playback device), the communicative coupling may include the first and second NMDs configured in a synchrony group, a bonded group, a consolidated group, or other type connected or combined configuration described herein.

The first NMD may receive a command to disable its microphone(s) from a user via one of the microphone of the NMD or a network interface of the NMD. In response to receiving the command to disable its microphone(s), the first NMD disables its microphone(s) and sends a command or message to the second NMD that causes the second NMD to disable its microphone(s), too. In this manner, the second NMD disables its microphone(s) in response to (i) determining that the first NMD (i.e., reference device) has changed to a "microphone disabled" state and/or (ii) receiving a command from the first NMD to disable its microphone(s).

After the first and second NMDs have disabled their microphones, the user may actuate a physical button or switch on one of the NMDs that in turn causes both the first and second NMD to re-enable their microphones. In one example, the user actuates the physical button or switch on the second NMD, which causes the second NMD to re-enable its previously-disabled microphone(s). In operation, the second NMD may then re-enable its previously-disabled microphone(s) and send a command or message to the first NMD that causes the first NMD to re-enable its previously-disabled microphone(s), too. In this manner, the first NMD enables its microphone(s) in response to (i) determining that the second NMD (i.e., reference device) has changed to a "microphone enabled" state and/or (ii) receiving a command from the second NMD to enable its microphone(s). This feature is advantageous for a user who wishes to enable/disable the microphones of all connected NMDs when he or she enables/disables the microphone(s) on one NMD of his or her NMD system.

In some examples, the NMD may be (i) a media playback device equipped with microphones, (ii) a component of a media playback device, and/or (iii) associated with a media playback device, where the NMD is one of a plurality of devices in a media playback system comprising the NMD and one or more media playback devices.

As mentioned earlier, in some embodiments, sets of individual media playback devices can be configured in different types of groupings, including but not limited to (i) a zone group where all of the media playback devices are configured to play back the same media content in synchrony, (ii) a bonded playback device comprising a stereo grouping of playback devices where a first media playback device is configured to play a right stereo channel of media content and a second media playback device is configured to play a left stereo channel of the media content, (iii) a bonded playback device comprising a quadraphonic grouping of playback devices where first, second, third, and fourth media playback devices are configured to play first, second, third, and fourth channels of the media content, respectively, (iv) a 5.1 surround mode grouping, where first, second, third, fourth, and fifth media playback devices are each configured to play an assigned one of five channels of media content, e.g., right front, center, left front, right rear, and left rear, or other 5-channel arrangement, (v) a 7.1 surround mode grouping, where first, second, third, fourth, fifth, six, and seventh media playback devices are each configured to play an assigned one of seven channels of media content, e.g., right front, center, left front, right side, left side, right rear, and left rear, or other 7-channel arrangement, (vi) a consolidated playback device comprising a grouping of media playback devices, where a first media playback device is configured to play a first assigned frequency range of media content (or perhaps assigned frequency range of assigned channel of media content) and a second media playback device is configured to a play a second assigned frequency range of media content (or perhaps assigned frequency range of assigned channel of media content), or other frequency-division assignment arrangement, (vii) a zone group comprising two or more consolidated playback devices; (viii) a bonded playback device comprising two or more consolidated playback devices; (ix) a zone group comprising two or more bonded playback devices, where each bonded playback device comprises two or more consolidated playback devices; (x) a zone group comprising any two or more of a standalone media playback device, a consolidated playback device, or a bonded playback device, in any combination; and/or (xi) any combination of the above-described groupings. In operation, any of the above-described groupings may correspond to a particular grouping state of a media playback device (or media playback system).

Additionally, as mentioned previously, in some embodiments, the NMD may be any of (i) a media playback device equipped with microphones, or (ii) a component of a media playback device. In any such embodiments, when one NMD in any of the above-described groupings disables its microphone(s), then one or more other NMDs in the grouping (or perhaps all the NMDs in the grouping) disable their microphones. And when one NMD in any of the above-described groupings enables it microphone(s), then one or more other NMDs in the grouping (or perhaps all the NMDs in the grouping) enable their microphones.

Further, and as mentioned previously, in some embodiments an NMD is associated with a media playback device or perhaps a grouping of media playback devices, where the NMD is one of a plurality of devices in a media playback system comprising one or more NMDs and one or more media playback devices in any of the above-described groupings. In any such embodiments, when one NMD associated with a grouping of media playback devices disables its microphone(s), then one or more other NMDs associated with the grouping of media playback devices (or perhaps all the NMDs associated with the grouping) disable their microphones. And when one NMD associated with the grouping of media playback devices enables its microphone(s), then one or more other NMDs associated with the grouping of media playback devices (or perhaps all the NMDs associated with the grouping) enable their microphones.

Still further, in some embodiments, any of the above-described groupings may include one or more NMDs in the grouping (e.g., either as a media playback device equipped with microphones or as a component of a media playback device) and one or more NMDs associated with the grouping. In any such embodiments, when any NMD in a grouping and/or associated with the grouping disables its microphone(s), then one or more other NMDs in the grouping and/or associated with the grouping (or perhaps all the NMDs in and/or associated with the grouping) disable their microphones. And when one NMD in and/or associated with the grouping enables its microphone(s), then one or more other NMDs in and/or associated with the grouping (or perhaps all the NMDs in and/or associated with the grouping) enable their microphones.

Some embodiments where the NMD is a media playback device with a microphone (or perhaps a component of a media playback device) are additionally configured to, at least in some situations, mute the speakers of the media playback device when the microphone is disabled and vice versa. Further, when such NMDs are configured in any of the above-described group arrangements, in some embodiments, disabling one NMD's microphone(s) in the group causes one or more other NMDs in the group (or perhaps all the NMDs in the group) to both (i) disable their microphone(s) and (ii) mute their speaker(s). Similarly, when such NMDs are configured in any of the above-described group configurations, in some embodiments, muting one NMD's speaker(s) in the group causes one or more other NMDs in the group (or perhaps all the NMDs in the group) to both (i) mute their speaker(s) and (ii) disable their microphone(s).

Additionally, in some embodiments where the NMD is a media playback device with a microphone (or perhaps a component of a media playback device), the media playback device (or at least the NMD therein) is configured to enable or disable its microphone(s) based on whether the device is a member of a zone group, a member of a consolidated playback device, and/or a member of a bonded playback device. In one such example embodiment, a zone group comprises three media playback devices, where each media playback device comprises one or more microphone(s). In this example, when the three media playback devices are initially grouped into the zone group, the primary playback device (i.e., master or head-end device) is configured to enable its microphone(s), and the two secondary playback devices (i.e., slave or subtending devices) are configured to disable their microphones. For example, a Sonos PLAYBAR and two Sonos PLAY:1 devices can be grouped into a zone group. Upon initial grouping into the zone group, the PLAYBAR determines that it is a master of the zone group and enables it microphones, and each PLAY:1 device determines that it is a slave to the PLAYBAR in the zone group and disables its microphones. Other scenarios of enabling and/or disabling microphones based on grouping of playback devices and NMDs are within the scope and spirit of the embodiments envisioned herein as well.

In some embodiments where the NMD is a media playback device with a microphone (or perhaps a component of a media playback device), the media playback device may be configured to disable its microphone based on its assigned zone name. For example, in some embodiments, a media playback device disables its microphone(s) in response to determining that it has been placed in a bedroom or baby room based on the media playback device having been assigned to a "Bedroom" or "Baby Room" zone or zone grouping, or perhaps other zone or room name corresponding to a location or room in a house where the user expects or desires more privacy.

Further, in some embodiments where the NMD is associated with a media playback device, the NMD is additionally configured to, at least in some situations, disable its microphone(s) when the speaker(s) of the associated media playback device has been muted. Further, when such NMDs are associated with two more media playback devices configured in any of the above-described group arrangements, in some embodiments, disabling the NMD's microphone(s) causes one or more associated media playback devices in the group (or perhaps all the media playback devices in the group) to mute their speaker(s). Similarly, when such NMDs are associated with two more media playback devices configured in any of the above-described group arrangements, in some embodiments, muting one of the associated media playback device's speaker(s) in the group causes both (i) one or more other media playback devices in the group (or perhaps all the media playback devices in the group) to mute their speaker(s) and (ii) the associated NMD to disable its microphone(s).

In another example, consistent with the embodiments discussed herein, an NMD may disable its microphone(s) in response to determining that the lights in the room are turned off (i.e., lights in "off" state). However, the user may want to control a media playback system via commands spoken to the NMD even though the lights are off. In this scenario, the user may open a user interface for the NMD running on a controller device of the NMD and select an "Enable Microphone" button via the user interface, thereby causing the controller to send a command that causes the NMD to enable its microphone(s).

Many of the above-described examples are scenarios where the microphone(s) of an NMD is disabled or enabled in response to determining that a single reference device is in a particular state (or not in that particular state). In some embodiments, the microphone(s) of an NMD is disabled in enabled in response to determining that two more reference devices are in a particular state.

In one example, the first reference device is a lighting system, the second reference device is an alarm clock, and the NMD is configured to disable its microphone(s) in response to a determination (by the NMD or a device controlling the NMD) that (i) the lighting system is in a "lights off" state and (ii) the alarm clock in a "wake up alarm set but not yet activated" state, which may indicate that the user is sleeping.

In another example, the reference device is a lighting system, the second reference device is a media playback device, and the NMD is configured to disable its microphone(s) in response a determination (by the NMD or a device controlling the NMD) that (i) the lighting system is in a "lights dimmed below a certain threshold" state and (ii) the media playback device is in a "playing a relaxation playlist" state, which may indicate that the user is meditating or otherwise relaxing.

In yet another example, the first reference device is a telephone, the second reference device is a motion sensor in a home office, and the NMD is configured to disable its microphone(s) in response a determination (by the NMD or a device controlling the NMD) that (i) the telephone is in a "phone call active" state and (ii) the motion sensor in the user's home office is in a "motion detected" state, which may indicate that the user is conducting a private or confidential telephone call where it might be undesirable for an NMD to have its microphone(s) enabled.

Enabling or disabling microphones(s) of an NMD based on more complicated state combinations of three, four, or more separate reference devices could be implemented according to the teachings herein, too.

Figure 7:
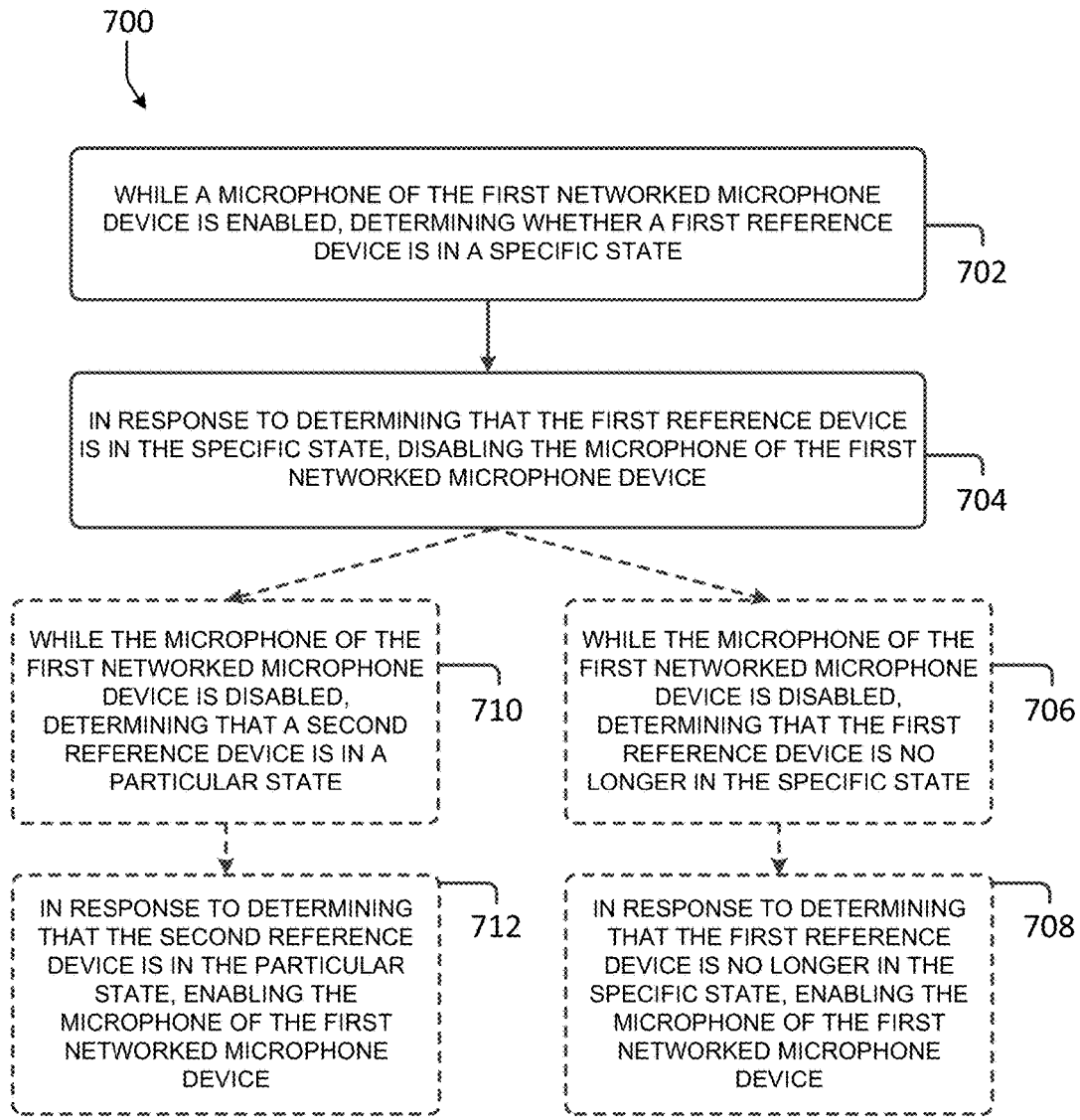
FIG. 7 shows an example method according to some embodiments.

Method 700 shown in FIG. 7 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the NMD shown in FIG. 6. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

Method 700 begins at block 702, which includes a first NMD (or alternatively a computing device configured to control the first NMD), while a microphone of the first networked microphone device is enabled, determining whether a first reference device is in a specific state. In some embodiments, determining whether a first reference device is in a specific state includes querying the first reference device to obtain its current state. In some embodiments, querying the first reference device to obtain its current state may include obtaining a state variable, state table, or table of state variables, or perhaps other configuration or state information of the reference device directly or indirectly from the reference device.

For example, the NMD (or a computing device configured to control the NMD) may obtain the state information (via a variable, table, table of variable, or other form) from the reference device over a wired or wireless LAN, WAN, ad hoc network, or other communications link. The NMD (or a computing device configured to control the NMD) may additionally or alternatively obtain the state information in any of the above-described forms from a computing device configured to control the reference device. In some embodiments, the computing device configured to control the NMD may store state information of the reference device and receive updates to the reference device's state directly or indirectly from the reference device. In some embodiments, the computing device configured to control the NMD may be the same computing device configured to control/monitor the reference device. This may be the case in scenarios where the NMD is a first media playback device and the reference device is a second media playback device. This may also be the case in scenarios where a single computing system is configured to control/monitor NMDs and reference devices, which may the case in embodiments where the computing system configured to control/monitor NMDs and reference devices is a local and/or cloud-based home automation server or application service.

In some embodiments, determining whether a first reference device is in a specific state includes receiving a first message (or command) via a network interface of the first NMD, wherein the message (or command) indicates that the first reference device is in the specific state. In still further embodiments, determining whether the first reference device is in the specific state includes querying a computing device that is configured to monitor or control the first reference device. And in still further embodiments, determining whether the first reference device is in the specific state includes the NMD receiving a first message (or command) via its network interface from a computing device configured to monitor or control the first reference device, where the first message (or command) indicates that the first reference device is in the specific state.

In some embodiments, the first reference device is any of (i) a reference device that is separate from the networked microphone device, (ii) a reference device that is a component of the networked microphone device, (iii) a reference device that is a component of a media playback device, (iv) a second NMD (or system of NMD s), and/or (v) a media playback device (or system of playback devices). The first reference device may be any other type of reference device disclosed or described herein.

In some example embodiments, the first reference device comprises one or more lights, and the specific state of the first reference device comprises one or more lights that are in a powered-off state. In other example embodiments, the first reference device comprises a media playback device, and the specific state of the media playback device comprises the media playback device configured to play content in synchrony with one or more additional media playback devices. In yet other example embodiments, the first reference device comprises a media playback device associated with the first NMD, wherein the specific state of the media playback device is the media playback device playing a first type of media content.

Alternatively, in some embodiments, the first reference device comprises a second NMD, wherein the state of the second NMD comprises a microphone of the second NMD is disabled.

Next, method 700 advances to block 704, which includes, in response to determining that the first reference device is in the specific state, disabling the microphone of the first NMD.

Next, method 700 may additionally advance to optional block 706, which includes, while the microphone of the first NMD is disabled, determining that the first reference device is no longer in the specific state. In operation, determining that the first reference device is no longer in the specific state may be performed in substantially the same as determining that the first reference device is in the specific state, e.g., via query, message, command, and so on.

Method 700 may then advance to optional block 708, which includes, in response to determining that the first reference device is no longer in the specific state, enabling the microphone of the first NMD.

Alternatively, instead of method 700 advancing to optional block 706, method 700 may instead advance to optional block 710, which includes, while the microphone of the first NMD is disabled, determining that a second reference device is in a particular state.

In some embodiments, the second reference device comprises a home security system, wherein the particular state of the home security system comprises an alarm-activated state. In other embodiments, the second reference device comprises a motion sensor, wherein the particular state of the motion sensor comprises a motion-detected state.

Next, method 700 may additionally advance to optional block 712, which includes, in response to determining that the second reference device is in the particular state, enabling the microphone of the first networked microphone device.

Figure 8:
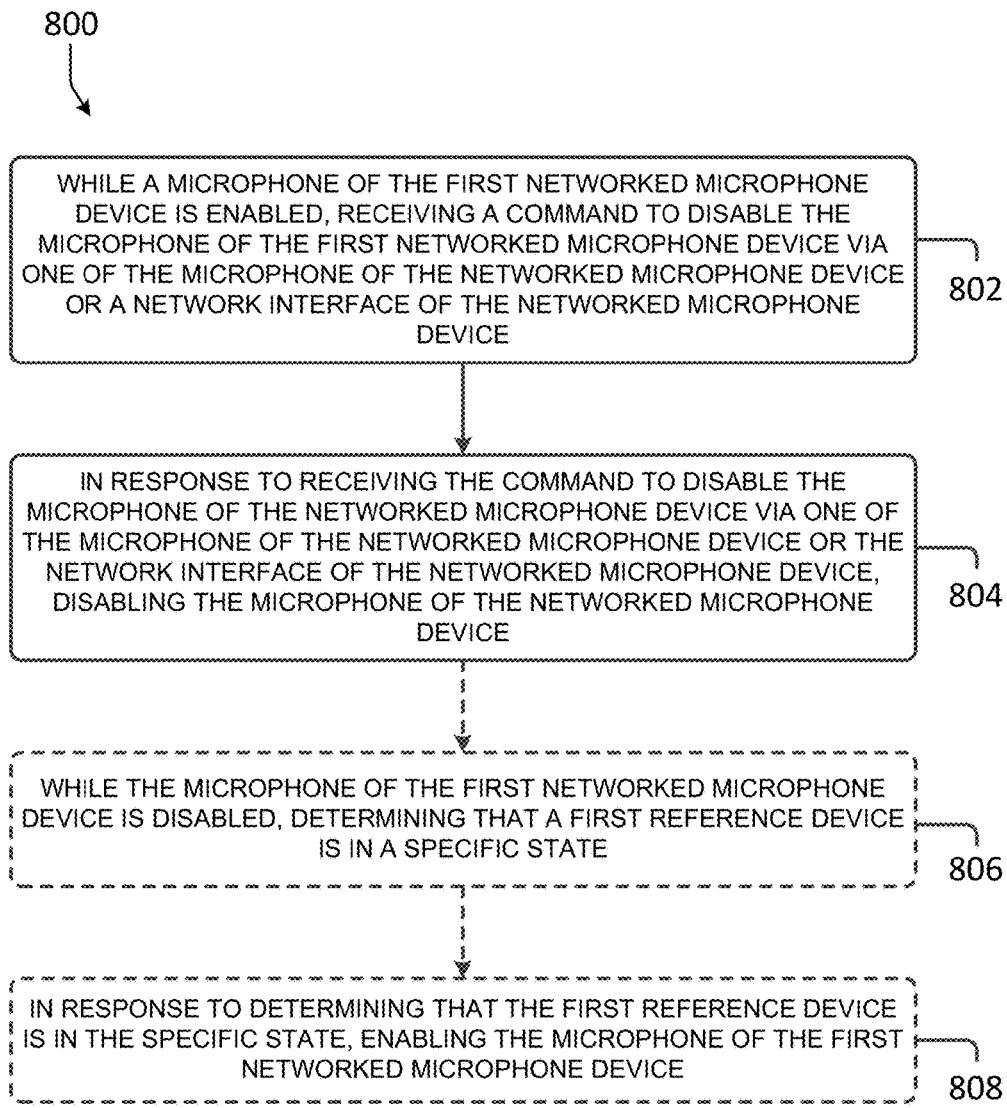
FIG. 8 shows an example method according to some embodiments.

Method 800 shown in FIG. 8 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 800 may include one or more operations, functions, or actions as illustrated by one or more of blocks 802-804. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes a first NMD, while a microphone of the first NMD is enabled, receiving a command to disable the microphone of the first NMD via one of (i) the microphone of the NMD or (ii) a network interface of the NMD.

In some embodiments, the command received via the microphone of the NMD comprises a voice command received via the microphone of the NMD. In other embodiments, the command received via the network interface of the NMD comprises a command received from a controller. In some embodiments, the controller is a device separate from the NMD.

Next, method 800 advances to block 804, which includes, in response to receiving the command to disable the microphone of the NMD via one of the microphone of the NMD or the network interface of the NMD, disabling the microphone of the NMD.

Next, method 800 may additionally advance to optional block 806, which includes, while the microphone of the first NMD is disabled, determining that a first reference device is in a specific state.

Method 800 may then advance to optional block 808, which includes, in response to determining that the first reference device is in the specific state, enabling the microphone of the first NMD.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. Tangible, non-transitory computer-readable media comprising instructions encoded therein, wherein the instructions, when executed by one or more processors, cause a first networked microphone device to perform a method comprising:
    while a microphone of the first networked microphone device is enabled, determining whether a first reference device is in a specific state; and
    in response to determining that the first reference device is in the specific state, disabling the microphone of the first networked microphone device, wherein the first reference device comprises a media playback device comprising a microphone, and wherein the specific state of the media playback device comprises the media playback device in a microphone disabled state.

2. The tangible, non-transitory computer-readable media of claim 1, wherein the method further comprises:
    while the microphone of the first networked microphone device is disabled, determining that the first reference device is no longer in the specific state; and
    in response to determining that the first reference device is no longer in the specific state, enabling the microphone of the first networked microphone device.

3. The tangible, non-transitory computer-readable media of claim 1, wherein the method further comprises:
    while the microphone of the first networked microphone device is disabled, determining that a second reference device is in a particular state; and
    in response to determining that the second reference device is in the particular state, enabling the microphone of the first networked microphone device.

4. The tangible, non-transitory computer-readable media of claim 3, wherein the second reference device comprises a home security system, and wherein the particular state of the home security system comprises an alarm-activated state.

5. The tangible, non-transitory computer-readable media of claim 3, wherein the second reference device comprises a motion sensor, and wherein the particular state of the motion sensor comprises a motion-detected state.

6. The tangible, non-transitory computer-readable media of claim 1, wherein determining whether the first reference device is in the specific state comprises querying the first reference device.

7. The tangible, non-transitory computer-readable media of claim 1, wherein determining whether the first reference device is in the specific state comprises querying a computing device associated with the first reference device.

8. The tangible, non-transitory computer-readable media of claim 1, wherein determining whether the first reference device is in the specific state comprises the first networked microphone device receiving a message via a network interface of the first networked microphone device, wherein the message indicates that the first reference device is in the specific state.

9. The tangible, non-transitory computer-readable media of claim 1, wherein the first reference device comprises one or more lights, and wherein the specific state of the first reference device comprises one or more lights that are in a powered-off state.

10. The tangible, non-transitory computer-readable media of claim 1, wherein the media playback device is configured to play content in synchrony with one or more additional media playback devices.

11. The tangible, non-transitory computer-readable media of claim 1, wherein the media playback device is configured to play content in synchrony with at least the first networked microphone device.

12. The tangible, non-transitory computer-readable media of claim 1, wherein the media playback device is a member of a grouping of media playback devices.

13. The tangible, non-transitory computer-readable media of claim 1, wherein the media playback device is a member of one of (i) a zone group comprising two or more media playback devices, (ii) a bonded playback device, and (iii) a consolidated playback device.

14. The tangible, non-transitory computer-readable media of claim 1, wherein the first reference device comprises a second networked microphone device, and wherein the specific state of the second networked microphone device comprises a microphone of the second networked microphone device is disabled.

15. The tangible, non-transitory computer-readable media of claim 1, wherein the media playback device is associated with the first networked microphone device, and wherein the specific state of the media playback device further comprises the media playback device playing a first type of media content.

16. The tangible, non-transitory computer-readable media of claim 1, wherein the first networked microphone device and the first reference device are contained within a common enclosure.

17. The tangible, non-transitory computer-readable media of claim 1, wherein the first networked microphone device and the media playback device are contained within a common enclosure, and wherein the specific state of the media playback device further comprises the media playback device playing a first type of media content.

18. The tangible, non-transitory computer-readable media of claim 16, wherein the first reference device is configured to provide a time of day, and wherein the specific state of the first reference device further comprises a time of day within a predefined range of times.

19. A first networked microphone device comprising:
one or more processors;
a microphone; and
tangible, non-transitory computer-readable media comprising instructions encoded therein, wherein the instructions, when executed by the one or more processors, cause the first networked microphone device to perform a method comprising:
while the microphone of the first networked microphone device is enabled, determining whether a first reference device is in a specific state; and
in response to determining that the first reference device is in the specific state, disabling the microphone of the first networked microphone device, wherein the first reference device comprises a media playback device comprising a microphone, and wherein the specific state of the media playback device comprises the media playback device in a microphone disabled state.

20. The first networked microphone device of claim 19, wherein the method further comprises:
while the microphone of the first networked microphone device is disabled, determining that the first reference device is no longer in the specific state; and
in response to determining that the first reference device is no longer in the specific state, enabling the microphone of the first networked microphone device.

21. The first networked microphone device of claim 19, wherein the method further comprises:
while the microphone of the first networked microphone device is disabled, determining that a second reference device is in a particular state; and
in response to determining that the second reference device is in the particular state, enabling the microphone of the first networked microphone device.

22. The first networked microphone device of claim 21, wherein the second reference device comprises at least one of (i) a home security system, and wherein the particular state of the home security system comprises an alarm-activated state, or (ii) a motion sensor, and wherein the particular state of the motion sensor comprises a motion-detected state.

23. The first networked microphone device of claim 19, wherein the first networked microphone device and the media playback device are contained within a common enclosure, and wherein the specific state of the media playback device further comprises the media playback device playing a first type of media content.

* * * * *